United States Patent
Howell et al.

(10) Patent No.: US 12,489,731 B1
(45) Date of Patent: Dec. 2, 2025

(54) METHODS FOR ENFORCING FIREWALL AND SECURITY POLICIES BASED ON SUBSCRIBER IDENTIFICATION AND DEVICES THEREOF

(71) Applicant: F5 Networks, Inc., Seattle, WA (US)

(72) Inventors: John Howell, Seattle, WA (US); Geoffrey Peterson, Seattle, WA (US); Ron Talmor, Sunnyvale, CA (US); Judge Kennedy Singh Arora, San Jose, CA (US)

(73) Assignee: F5, Inc., Seattle, WA (US)

( * ) Notice: Subject to any disclaimer, the term of this patent is extended or adjusted under 35 U.S.C. 154(b) by 508 days.

(21) Appl. No.: 16/282,008

(22) Filed: Feb. 21, 2019

Related U.S. Application Data (60) Provisional application No. 62/633,237, filed on Feb. 21, 2018.

(51) Int. Cl.
*H04L 9/40* (2022.01)
*H04W 12/08* (2021.01)
*H04W 12/088* (2021.01)

(52) U.S. Cl.
CPC ...... *H04L 63/0245* (2013.01); *H04L 63/0236* (2013.01); *H04L 63/1408* (2013.01); *H04L 63/20* (2013.01); *H04W 12/08* (2013.01); *H04W 12/088* (2021.01); *H04L 63/0892* (2013.01)

(58) Field of Classification Search
CPC . H04L 63/0245; H04L 63/20; H04L 63/0236; H04L 63/1408; H04L 63/0892; H04W 12/08; H04W 12/088
See application file for complete search history.

(56) References Cited

U.S. PATENT DOCUMENTS

| 8,117,640 | B1 | 2/2012 | Moriconi et al. |
| 9,258,321 | B2 | 2/2016 | Amsler et al. |
| 9,503,885 | B2 * | 11/2016 | Garcia ............ H04W 8/205 |

(Continued)

FOREIGN PATENT DOCUMENTS

| EP | 2782311 | 9/2014 |
| EP | 2903238 A3 | 12/2015 |

(Continued)

OTHER PUBLICATIONS

European Search Report for corresponding EP Application No. 20199343.3, pp. 1-10, mailed Mar. 3, 2021.

(Continued)

*Primary Examiner* — Cheng-Feng Huang
(74) *Attorney, Agent, or Firm* — TROUTMAN PEPPER LOCKE LLP (57) ABSTRACT

Methods, non-transitory computer readable media, and network security manager apparatus that assists with enforcing firewall and security policies based on subscriber identification and subscriber class includes receiving network traffic from a plurality of client devices. A unique subscriber identification number and a subscriber class for each of the plurality of client devices is identified. One or more network security policies associated with each of the identified unique subscriber identification number and the subscriber class is obtained. Each of the obtained one or more network security policies is enforced on the corresponding plurality of client devices or a network security manager apparatus.

12 Claims, 4 Drawing Sheets

(56) References Cited

U.S. PATENT DOCUMENTS

| | | | |
|---|---|---|---|
| 10,356,050 B1* | 7/2019 | Kumar | H04L 67/02 |
| 11,057,428 B1* | 7/2021 | Sellers | G06F 16/27 |
| 2002/0194506 A1* | 12/2002 | Wiley | H04L 12/2874 |
| | | | 726/22 |
| 2003/0069973 A1* | 4/2003 | Ganesan | H04L 63/0485 |
| | | | 709/226 |
| 2004/0103310 A1* | 5/2004 | Sobel | H04L 63/105 |
| | | | 709/223 |
| 2006/0155853 A1* | 7/2006 | Nesz | H04L 63/1466 |
| | | | 709/227 |
| 2011/0116377 A1* | 5/2011 | Batz | H04M 15/66 |
| | | | 370/235 |
| 2013/0205361 A1* | 8/2013 | Narayanaswamy | |
| | | | H04L 63/1408 |
| | | | 726/1 |
| 2014/0096229 A1 | 4/2014 | Burns et al. | |
| 2014/0298469 A1 | 10/2014 | Marion | |
| 2015/0040192 A1 | 2/2015 | Kobold | |
| 2015/0043430 A1* | 2/2015 | Garcia Martin | H04L 61/157 |
| | | | 370/328 |
| 2015/0047032 A1 | 2/2015 | Hannis | |
| 2015/0326599 A1 | 11/2015 | Vissamsetty | |
| 2016/0044025 A1 | 2/2016 | Goyal | |
| 2016/0094423 A1* | 3/2016 | Parthasarathy | H04L 61/6018 |
| | | | 709/224 |
| 2017/0222979 A1 | 8/2017 | Kuperman | |
| 2017/0302628 A1* | 10/2017 | Vazquez Carames | |
| | | | H04L 61/5007 |
| 2017/0310704 A1 | 10/2017 | Wu | |
| 2018/0167412 A1 | 6/2018 | Barrett | |
| 2018/0183833 A1* | 6/2018 | Skene | H04L 63/20 |
| 2019/0253389 A1* | 8/2019 | Verma | H04W 12/088 |
| 2021/0097569 A1 | 4/2021 | Devane | |

FOREIGN PATENT DOCUMENTS

| | | |
|---|---|---|
| EP | 3823241 A1 | 5/2021 |
| WO | 2015134008 A1 | 9/2015 |

OTHER PUBLICATIONS

BIG-IP® Access Policy Manager®: Implementations, Version 13.0, F5 Networks, Inc. (2017).

F5 Networks, Inc., "BIG-IP Network Firewall: Policies and Implementations," Version 11.3, pp. 3-6, 8, 33-34, 40-41, 44, 52-55, and 57 (Nov. 2012).

F5 Networks, Inc., "BIG-IP Network Firewall: Policies and Implementations," Version 11.4, pp. 3-6, 17, 61-67, and 69-70 (May 2013).

F5 Networks, Inc., "BIG-IP Policy Enforcement Manager: Implementations," Version 11.4, pp. 1-96 (May 2013).

* cited by examiner

METHODS FOR ENFORCING FIREWALL AND SECURITY POLICIES BASED ON SUBSCRIBER IDENTIFICATION AND DEVICES THEREOF

This application claims the benefit of U.S. Provisional Patent Application Ser. No. 62/633,237, filed Feb. 21, 2018, which is hereby incorporated by reference in its entirety.

FIELD

This technology generally relates to methods and devices for network traffic management and, more particularly, to methods for enforcing firewall and security policies based on subscriber identification and devices thereof.

BACKGROUND

A firewall is typically a device or a set of devices, or software executed on a device, such as a computer, that provides a firewall function for network access. For example, firewalls can be integrated into operating systems of devices including computers, smart phones, or other types of network communication capable devices. A firewall generally protects networks from unauthorized access while permitting authorized communications to pass through the firewall. Firewalls typically deny or permit network transmission based on a set of rules. Prior technologies generally use the internet protocol address of the requesting device to determine whether to deny or permit the network transmission. However, unfortunately these prior technologies have not completely prevented unauthorized access to the secure network system.

SUMMARY

A method for enforcing firewall and security policies based on subscriber identification includes receiving network traffic from a plurality of client devices. A unique subscriber identification number and a subscriber class for each of the plurality of client devices is identified. One or more network security policies associated with each of the identified unique subscriber identification number and the subscriber class is obtained. Each of the obtained one or more network security policies is enforced on the corresponding plurality of client devices or a network security manager apparatus.

A non-transitory computer readable medium having stored thereon instructions for enforcing firewall and security policies based on subscriber identification comprising machine executable code which when executed by at least one processor, causes the processor to perform steps including receiving network traffic from a plurality of client devices. A unique subscriber identification number and a subscriber class for each of the plurality of client devices is identified. One or more network security policies associated with each of the identified unique subscriber identification number and the subscriber class is obtained. Each of the obtained one or more network security policies is enforced on the corresponding plurality of client devices or a network security manager apparatus.

A network traffic management apparatus including at least one of configurable hardware logic configured to be capable of implementing or a processor coupled to a memory and configured to execute programmed instructions stored in the memory to receive network traffic from a plurality of client devices. A unique subscriber identification number and a subscriber class for each of the plurality of client devices is identified. One or more network security policies associated with each of the identified unique subscriber identification number is obtained. Each of the obtained one or more network security policies is enforced on the corresponding plurality of client devices or a network security manager apparatus.

A network traffic management system, comprising one or more traffic management apparatuses, client devices, or server devices, the network traffic management system comprising memory comprising programmed instructions stored thereon and one or more processors configured to be capable of executing the stored programmed instructions to receive network traffic from a plurality of client devices. A unique subscriber identification number and a subscriber class for each of the plurality of client devices is identified. One or more network security policies associated with each of the identified unique subscriber identification number and the subscriber class is obtained. Each of the obtained one or more network security policies is enforced on the corresponding plurality of client devices or a network security manager apparatus.

This technology provides a number of advantages including providing a method, non-transitory computer readable medium, apparatus, and system that assist with enforcing firewall and security policies based on subscriber identification and the subscriber class. By using the subscriber information, the disclosed technology is able to more effectively prevent unauthorized access to the secure network system.

DETAILED DESCRIPTION

Figure 1:
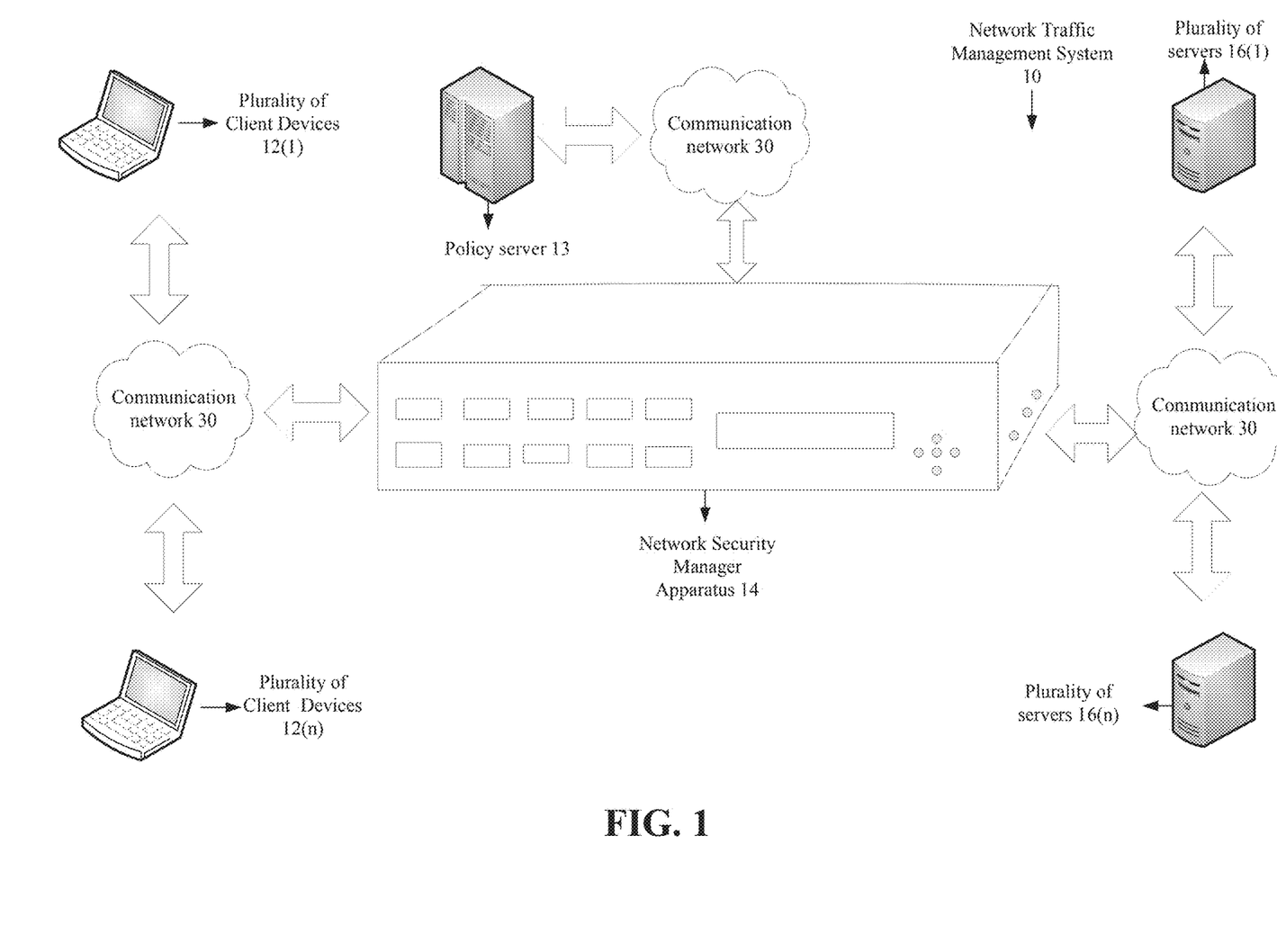
FIG. 1 is an example of a block diagram of a network traffic management system including a network traffic management apparatus for enforcing firewall and security policies based on subscriber identification.
Figure 2:
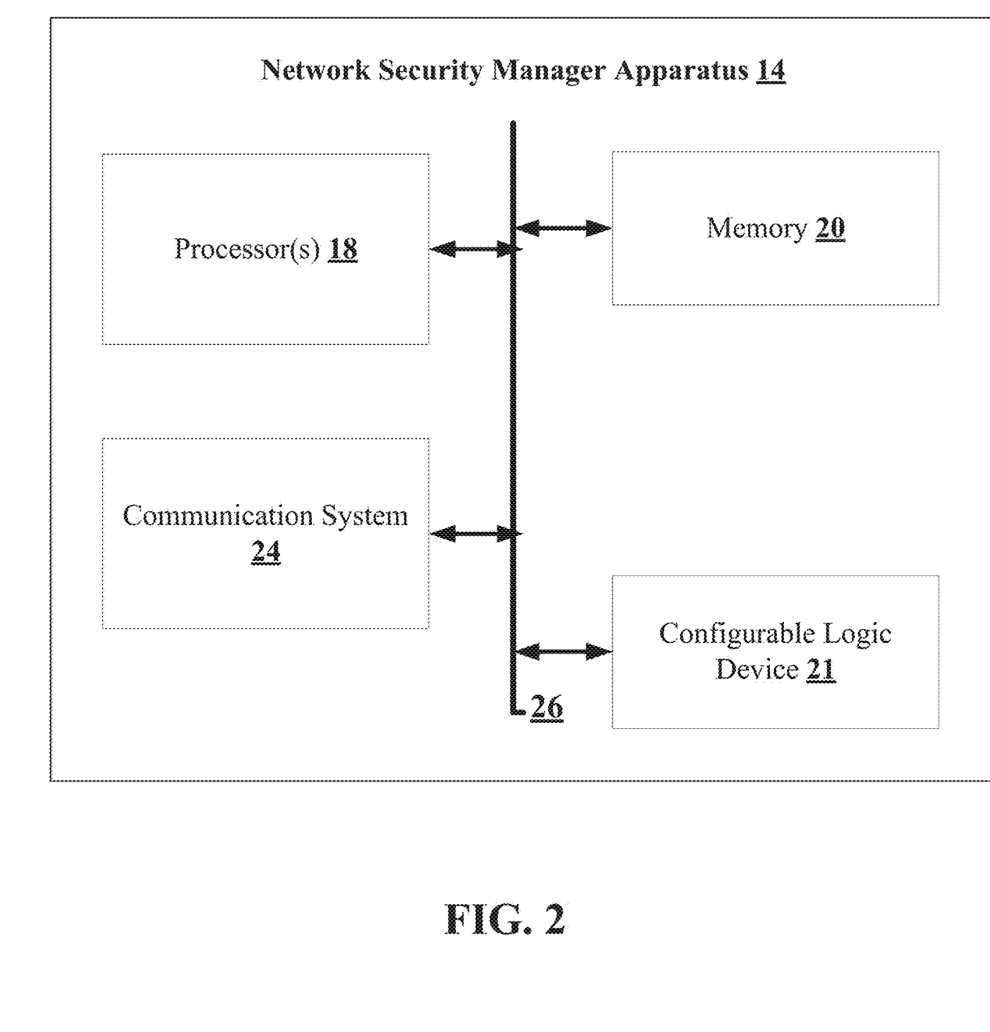
FIG. 2 is an example of a block diagram of a network traffic management apparatus.

An example of a network environment 10 which incorporates a network traffic management system for enforcing firewall and security policies based on subscriber identification with the network security manager apparatus 14 is illustrated in FIGS. 1 and 2. The exemplary environment 10 includes a plurality of client devices 12(1)-12(n), a policy server 13, a network security manager apparatus 14, and a plurality of servers 16(1)-16(n) which are coupled together by communication networks 30, although the environment can include other types and numbers of systems, devices, components, and/or elements and in other topologies and deployments. While not shown, the exemplary environment 10 may include additional network components, such as routers, switches and other devices, which are well known to those of ordinary skill in the art and thus will not be described here. This technology provides a number of advantages including more effectively enforcing firewall and security policies based on subscriber identification.

Referring more specifically to FIGS. 1 and 2, the network security manager apparatus 14 of the network traffic management system 10 is coupled to the plurality of client devices 12(1)-12(n) through the communication network 30, although the plurality of client devices 12(1)-12(n) and network security manager apparatus 14 may be coupled together via other topologies. As illustrated in FIG. 1, the network security manager apparatus 14 is coupled to the policy server 13 through the communication network 30, although the network security manager apparatus 14 can be coupled to the policy server 13 via other topologies. Additionally, the network security manager apparatus 14 is coupled to the plurality of servers 16(1)-16(n) through the communication network 30, although the plurality of servers 16(1)-16(n) and the network security manager apparatus 14 may be coupled together via other topologies. Furthermore, the plurality of servers 16(1)-16(n) is coupled to the policy server 13 via communication network 30, although the plurality of servers 16(1)-16(n) can be coupled to the policy server 13 via other topologies. Alternatively, the steps disclosed in FIG. 3 and FIG. 4 can also be implemented in an internet of things (Iot) environment.

The network security manager apparatus 14 assists with enforcing firewall and security policies based on subscriber identification and policy or subscriber class for the subscriber as illustrated and described by way of the examples herein, although the network security manager apparatus 14 may perform other types and/or numbers of functions. As illustrated in FIG. 2, the network security manager apparatus 14 includes processor or central processing unit (CPU) 18, memory 20, optional configurable hardware logic 21, and a communication system 24 which are coupled together by a bus device 26 although the network security manager apparatus 14 may comprise other types and numbers of elements in other configurations. In this example, the bus 26 is a PCI Express bus in this example, although other bus types and links may be used.

The processors 18 within the network security manager apparatus 14 may execute one or more computer-executable instructions stored in memory 20 for the methods illustrated and described with reference to the examples herein, although the processor can execute other types and numbers of instructions and perform other types and numbers of operations. The processor 18 may comprise one or more central processing units ("CPUs") or general purpose processors with one or more processing cores, such as AMD® processor(s), although other types of processor(s) could be used (e.g., Intel®).

Figure 3:
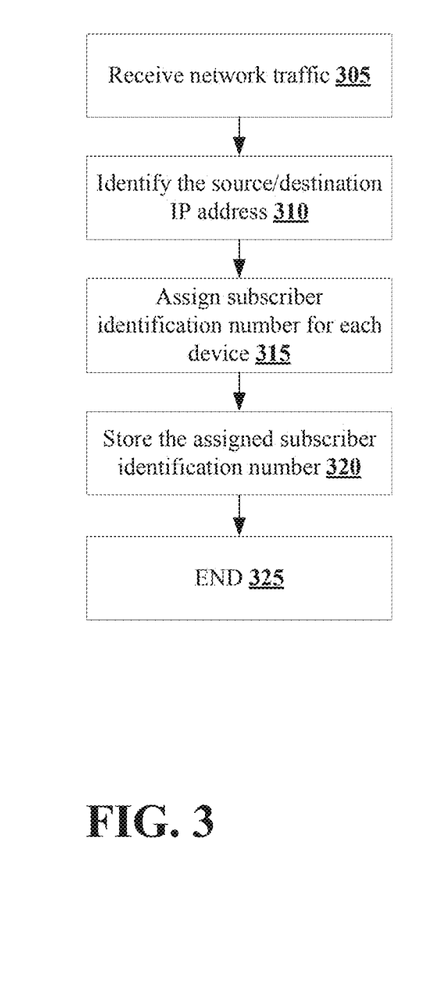
FIG. 3 is an exemplary flowchart of a method for enforcing firewall and security policies based on subscriber identification.
Figure 4:
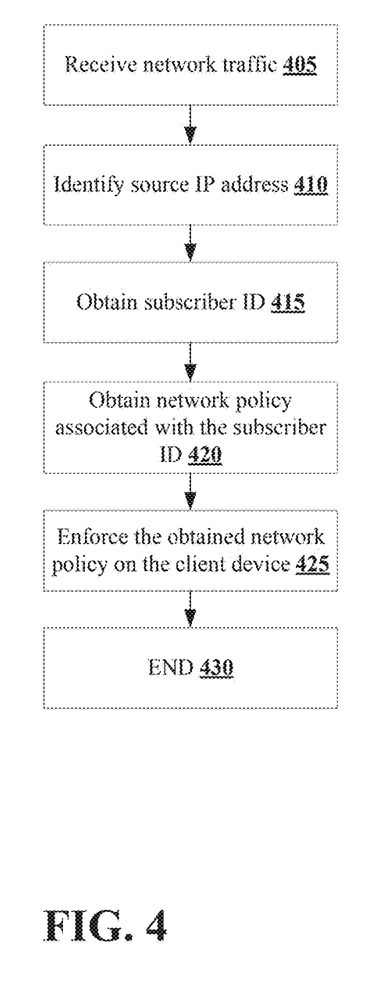
FIG. 4 is an exemplary sequence diagram for enforcing firewall and security policies based on subscriber identification.

The memory 20 within the network security manager apparatus 14 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. The memory 20 may store one or more non-transitory computer-readable instructions of this technology as illustrated and described with reference to the examples herein that may be executed by the processor 18. The exemplary flowcharts shown in FIGS. 3-4 are representative of example steps or actions of this technology that may be embodied or expressed as one or more non-transitory computer or machine readable instructions stored in the memory 20 that may be executed by the processor 18 and/or may be implemented by configured logic in the optional configurable logic 21.

Accordingly, the memory 20 of the network security manager apparatus 14 can store one or more applications that can include computer executable instructions that, when executed by the network security manager apparatus 14, causes the network security manager apparatus 14 to perform actions, such as to transmit, receive, or otherwise process messages, for example, and to perform other actions described and illustrated below with reference to FIG. 3. The application(s) can be implemented as module or components of another application. Further, the application(s) can be implemented as operating system extensions, module, plugins, or the like. The application(s) can be implemented as module or components of another application. Further, the application(s) can be implemented as operating system extensions, module, plugins, or the like. Even further, the application(s) may be operative in a cloud-based computing environment. The application(s) can be executed within virtual machine(s) or virtual server(s) that may be managed in a cloud-based computing environment. Also, the application(s), including the network security manager apparatus 14 itself, may be located in virtual server(s) running in a cloud-based computing environment rather than being tied to one or more specific physical network computing devices. Also, the application(s) may be running in one or more virtual machines (VMs) executing on the network security manager apparatus 14. Additionally, in at least one of the various embodiments, virtual machine(s) running on the network security manager apparatus 14 may be managed or supervised by a hypervisor.

The optional configurable hardware logic device 21 in the network security manager apparatus 14 may comprise specialized hardware configured to implement one or more steps of this technology as illustrated and described with reference to the examples herein. By way of example only, the optional configurable logic hardware device 21 may comprise one or more of field programmable gate arrays ("FPGAs"), field programmable logic devices ("FPLDs"), application specific integrated circuits (ASICs") and/or programmable logic units ("PLUS").

The communication system 24 in the network security manager apparatus 14 is used to operatively couple and communicate between the network security manager apparatus 14, the policy server 13, the plurality of client devices 12(1)-12(n) and the plurality of servers 16(1)-16(n) which are all coupled together by communication network 30 such as one or more local area networks (LAN) and/or the wide area network (WAN), although other types and numbers of communication networks or systems with other types and numbers of connections and configurations to other devices and elements may be used. By way of example only, the communication network such as local area networks (LAN) and the wide area network (WAN) can use TCP/IP over Ethernet and industry-standard protocols, including HTTP/2, COAP, MQTT, NFS, CIFS, SOAP, XML, LDAP, and SNMP, although other types and numbers of communication networks, can be used. In this example, the bus 26 is a PCI Express bus in this example, although other bus types and links may be used.

Each of the plurality of client devices 12(1)-12(n) of the network traffic management system 10, include a central processing unit (CPU) or processor, a memory, input/display device interface, configurable logic device and an input/output system or I/O system, which are coupled together by a bus or other link. The plurality of client devices 12(1)-12(n), in this example, may run interface applications, such as Web browsers, that may provide an interface to make change network configurations via the network security manager apparatus 14. Additionally, the plurality of client devices 12(1)-12(n) can include any type of computing device that can receive, render, and facilitate user interaction, such as client computers, network computer, mobile computers, mobile phones, virtual machines (including cloud-based computer), or the like. Each of the plurality of client devices 12(1)-12(n) utilizes the network security manager apparatus 14 to conduct one or more operations with the plurality of servers 16(1)-16(n), such as to obtain data and/or access the applications from one of the plurality of servers 16(1)-16(n), by way of example only, although other numbers and/or types of systems could be utilizing these resources and other types and numbers of functions utilizing other types of protocols could be performed.

The policy server 13 in this example can include a central processing unit (CPU) or processor, a memory, input/display device interface, configurable logic device and an input/output system or I/O system, which are coupled together by a bus or other link. The policy server 13, in this example, may run interface applications that may provide an interface to send and/or receive data to and/or from the network security manager apparatus 14 or the plurality of servers 16(1)-16(n). In this example, the policy server 13 provides the requested policy to enforce security on the plurality of client devices 12(1)-12(n), although the policy server 13 can perform other types or amounts of functions. Additionally, the policy server 13 can include any type of computing device that can receive, render, and facilitate user interaction, such as client computers, network computer, mobile computers, mobile phones, virtual machines (including cloud-based computer), or the like.

Each of the plurality of servers 16(1)-16(n) of the network traffic management system include a central processing unit (CPU) or processor, a memory, and a communication system, which are coupled together by a bus or other link, although other numbers and/or types of network devices could be used. Generally, the plurality of servers 16(1)-16(n) are configured to perform network traffic management through the network traffic management apparatus 14 via the communication network 30 according to the HTTP-based application RFC protocol or the CIFS or NFS protocol in this example, but the principles discussed herein are not limited to this example and can include other application protocols. A series of applications may run on the plurality web application servers 16(1)-16(n) that allows the transmission of data requested by the plurality of client devices 12(1)-12(n), the policy server 13, or the network security manager apparatus 14. The plurality of servers 16(1)-16(n) may provide data or receive data in response to requests directed toward the plurality of servers 16(1)-16(n) from the plurality of client devices 12(1)-12(n) or the network security manager apparatus 14. It is to be understood that the plurality of servers 16(1)-16(n) may be hardware or software or may represent a system with multiple external resource servers, which may include internal or external networks. In this example the plurality of servers 16(1)-16(n) may be any version of Microsoft® IIS servers or Apache® servers, although other types of servers may be used.

Although the plurality of servers 16(1)-16(n) are illustrated as single servers, one or more actions of the plurality of servers 16(1)-16(n) may be distributed across one or more distinct network computing devices. Moreover, the plurality of servers 16(1)-16(n) are not limited to a particular configuration. Thus, the plurality of servers 16(1)-16(n) may contain a plurality of network computing devices that operate using a master/slave approach, whereby one of the network computing devices of the plurality of servers 16(1)-16(n) operate to manage and/or otherwise coordinate operations of the other network computing devices. The plurality of servers 16(1)-16(n) may operate as a plurality of network computing devices within cluster architecture, a peer-to peer architecture, virtual machines, or within a cloud architecture.

Thus, the technology disclosed herein is not to be construed as being limited to a single environment and other configurations and architectures are also envisaged. For example, the one or more of the plurality of servers 16(1)-16(n) depicted in FIG. 1 can operate within network security manager apparatus 14 rather than as a stand-alone server communicating with network security manager apparatus 14 via the communication network(s) 30. In this example the plurality of servers 16(1)-16(n) operate within the memory 20 of the network security manager apparatus 14.

While the network security manager apparatus 14 is illustrated in this example as including a single device, the network security manager apparatus 14 in other examples can include a plurality of devices or blades each with one or more processors each processor with one or more processing cores that implement one or more steps of this technology. In these examples, one or more of the devices can have a dedicated communication interface or memory. Alternatively, one or more of the devices can utilize the memory, communication interface, or other hardware or software components of one or more other communicably coupled of the devices. Additionally, one or more of the devices that together comprise network security manager apparatus 14 in other examples can be standalone devices or integrated with one or more other devices or applications, such as one of the plurality of servers 16(1)-16(n) or, the network security manager apparatus 14, or applications coupled to the communication network(s), for example. Moreover, one or more of the devices of the network security manager apparatus 14 in these examples can be in a same or a different communication network 30 including one or more public, private, or cloud networks, for example.

Although an exemplary network traffic management system 10 with the plurality of client devices 12(1)-12(n), the policy server 13, the network security manager apparatus 14, and the plurality of servers 16(1)-16(n), communication networks 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Further, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

One or more of the components depicted in the network traffic management system 10, such as the network security manager apparatus 14, the plurality of client devices 12(1)-12(n), the policy server 13, the plurality of servers 16(1)-16(n), for example, may be configured to operate as virtual instances on the same physical machine. In other words, one or more of network security manager apparatus 14, the plurality of client devices 12(1)-12(n), or the plurality of servers 16(1)-16(n) illustrated in FIG. 1 may operate on the same physical device rather than as separate devices communicating through a network as depicted in FIG. 1. There may be more or fewer plurality of client devices 12(1)-12(n), network security manager apparatus 14, the policy server 13 or the plurality of servers 16(1)-16(n) than depicted in FIG. 1. The plurality of client devices 12(1)-12(n), the plurality of servers 16(1)-16(n) could be implemented as applications on network security manager apparatus 14.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An example of a method for enforcing firewall and security policies based on subscriber identification will now be described with reference to FIGS. 1-4. First with reference to FIG. 3, in step 305 the network security manager apparatus 14 receives network traffic from the plurality of client devices 12(1)-12(n), although the network security manager apparatus 14 can receive the network traffic from other devices such as the plurality of servers 16(1)-16(n). In this example, the network traffic includes a plurality of network packets with payload, although the network traffic can include other types and/or amounts of data.

In step 310, the network security manager apparatus 14 identifies a source internet protocol (IP) address in each of the received plurality of network packets, although the network security manager apparatus 14 can identify both the source and destination IP address from the plurality of network packets.

Next in step 315, the network security manager apparatus 14 assigns a subscriber identification number for each of the identified source IP address, although the network security manager apparatus 14 can assign a unique subscriber identification in other manners, such as to both the source and destination IP address. Alternatively, the network security manager apparatus 14 can obtain the subscriber identification number associated with the source or destination IP address from other locations. In another example, the network security manager apparatus 14 can assign the subscriber identification to unique identification value associated with the device sending the plurality of network packets.

In step 320, the network security manager apparatus 14 stores the subscriber identification number along with the corresponding source IP address in a table within the memory 20, although the network security manager apparatus 14 can store the subscriber identification number and the corresponding source IP address in other formats at other memory locations. Additionally, the network security manager apparatus 14 continues to monitor network traffic and associates each of the network packets to the subscriber identification number and builds a database and the exemplary method ends at step 325.

Next, FIG. 4 illustrates an example of a method for using the subscriber information. In step 405, the network security manager apparatus 14 receives network traffic from the plurality of client devices 12(1)-12(n), although the network security manager apparatus 14 can receive the network traffic from other devices such as the plurality of servers 16(1)-16(n). In this example, the network traffic includes a plurality of network packets with payload, although the network traffic can include other types or amounts of data.

In step 410, the network security manager apparatus 14 identifies a source internet protocol (IP) address in each of the received plurality of network packets, although the network security manager apparatus 14 can identify both the source and destination IP address from the plurality of network packets.

In step 415, the network security manager apparatus 14 obtains the subscriber identification number associated with the identified source IP address from the table stored within the memory 20, although the network security manager apparatus 14 can obtain the subscriber identification number from other memory locations. Additionally, the network security manager apparatus 14 also obtains the subscriber class or classes associated with the identified source IP address from the table stored within the memory 20. In other examples, the network security manager apparatus 14 can determine if the subscriber identification number is present for the identified source IP address and the exemplary flow can proceed to steps illustrated in FIG. 3 when the subscriber identification number is not present.

Next in step 420, the network security manager apparatus 14 obtains the network security policy or policies for the obtained subscriber identification from the memory 20, although the network security manager apparatus 14 can obtain the network security policy from the policy server 13. In this example, the obtained network policy or policies includes rules for managing the network traffic flow from the source IP address, although the obtained network policy can include other types of amounts of information. By way of example, the rules can include providing additional bandwidth or decreasing bandwidth, throttling the packets at a higher or lower rate, assigning the packets to a specific server, although the rules can include other types or amounts of functions. Additionally in this example, the rules associated with the network security policy can allow the network security manager apparatus 14 to apply rules on data inside a tunnel (such as GTP, GRE, IPinIP, and others), as well as on data that is not tunneled. In another example, the network security policy or policies could be used to manage the network traffic from the client device based on paid subscription service associated with client device. Alternatively, the network security manager apparatus 14 can obtain one or more rules associated with the obtained network security policy or policies from external server (not shown).

In step 425, the network security manager apparatus 14 applies or enforces the obtained network security policy or policies along with the firewall to the client device associated with the source IP address of the network traffic, although the network security manager apparatus 14 can perform other types of operations on the client device associated with the source IP address. Alternatively, the network security manager apparatus 14 can also apply or enforce the obtained network security policy or policies along with the firewall to another network security manager apparatus. The exemplary method ends at step 430.

Accordingly, as illustrated and described by way of the examples herein this technology assists with more effectively enforcing firewall and security policies based on subscriber identification. By using the subscriber information, the disclosed technology is able to more effectively prevent unauthorized access to the secure network system.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method for enforcing firewall and security policies based on subscriber identification, the method implemented by a network traffic management system comprising one or more network traffic apparatuses, client devices, or server devices, the method comprising:
   receiving network traffic from a client computing device of a plurality of client computing devices;
   identifying a source internet protocol (IP) address and a destination internet protocol (IP) address for at least one network packet in the network traffic from the client computing device;
   assigning a unique subscriber identification number to the source internet protocol (IP) address and another unique identification number to the destination internet protocol (IP) address, wherein the source internet protocol (IP) address is different from the destination internet protocol (IP) address;
   storing an association between the unique subscriber identification number and the source internet protocol (IP) address and the another unique identification number to the destination internet protocol (IP) address in a database, wherein the database is compiled by (i) monitoring the network traffic, (ii) associating source internet protocol (IP) addresses related to network packets in the network traffic to corresponding unique subscriber identification numbers in the database, and (iii) associating destination internet protocol (IP) addresses related to network packets in the network traffic to corresponding another unique subscriber identification numbers in the database;
   retrieving the unique subscriber identification number and the another unique identification number for the client computing device stored in memory from the database by using the source internet protocol (IP) address and the destination internet protocol (IP) address of subsequent network traffic of the client computing device;
   obtaining a network security policy associated with the identified unique subscriber identification number or the identified another unique subscriber identification; and
   enforcing the obtained network security policy on the client computing device.

2. The method as set forth in claim 1 wherein the network security policy is obtained from a policy server.

3. The method as set forth in claim 1 wherein the enforcing further comprises, enforcing the obtained network security policy on tunneled data from the client computing device.

4. A non-transitory computer readable medium having stored thereon instructions for enforcing firewall and security policies based on subscriber identification comprising executable code which when executed by one or more processors, causes the processors to:
   receive network traffic from a client computing device of a plurality of client computing devices;
   identify a source internet protocol (IP) address and a destination internet protocol (IP) address for at least one network packet in the network traffic from the client computing device;
   assign a unique subscriber identification number to the source internet protocol (IP) address and another unique identification number to the destination internet protocol (IP) address, wherein the source internet protocol (IP) address is different from the destination internet protocol (IP) address;
   store an association between the unique subscriber identification number and the source internet protocol (IP) address and the another unique identification number to the destination internet protocol (IP) address in a database, wherein the database is compiled by (i) monitoring the network traffic, (ii) associating source internet protocol (IP) addresses related to network packets in the network traffic to corresponding unique subscriber identification numbers in the database, and (iii) associating destination internet protocol (IP) addresses related to network packets in the network traffic to corresponding another unique subscriber identification numbers in the database;
   retrieve the unique subscriber identification number and the another unique identification number for the client computing device stored in memory from the database by using the source internet protocol (IP) address and the destination internet protocol (IP) address of subsequent network traffic of the client computing device;
   obtain a network security policy associated with the identified unique subscriber identification number or the identified another unique subscriber identification; and
   enforce the obtained network security policy on the client computing device.

5. The medium as set forth in claim 4 wherein the network security policy is obtained from a policy server.

6. The medium as set forth in claim 4 wherein the enforcing further comprises, enforcing the obtained network security policy on tunneled data from the client computing device.

7. A network security manager apparatus, comprising memory comprising programmed instructions stored in the memory and one or more processors configured to execute the programmed instructions stored in the memory to:
   receive network traffic from a client computing device from a plurality of client computing devices;
   identify a source internet protocol (IP) address and a destination internet protocol (IP) address for at least one network packet in the network traffic from the client computing device;
   assign a unique subscriber identification number to the source internet protocol (IP) address and another unique identification number to the destination internet protocol (IP) address;

store an association between the unique subscriber identification number and the source internet protocol (IP) address and the another unique identification number to the destination internet protocol (IP) address in a database, wherein the database is compiled by (i) monitoring the network traffic, (ii) associating source internet protocol (IP) addresses related to network packets in the network traffic to corresponding unique subscriber identification numbers in the database, and (iii) associating destination internet protocol (IP) addresses related to network packets in the network traffic to corresponding another unique subscriber identification numbers in the database;

retrieve the unique subscriber identification number and the another unique subscriber identification for the client computing device stored in memory from the database by using the source internet protocol (IP) address and the destination internet protocol (IP) address of subsequent network traffic of the client computing device;

obtain a network security policy associated with the identified unique subscriber identification number or the identified another unique subscriber identification; and enforce the obtained network security policy on the client computing device.

8. The apparatus as set forth in claim 7 wherein the network security policy is obtained from a policy server.

9. The apparatus as set forth in claim 7 wherein the one or more processors are further configured to execute the programmed instructions stored in the memory wherein the enforcing further comprises, enforcing the obtained network security policy on tunneled data from the client computing device.

10. A network traffic management system, comprising one or more traffic management apparatuses, client devices, or server devices, the network traffic management system comprising memory comprising programmed instructions stored thereon and one or more processors configured to execute the stored programmed instructions to:

receive network traffic from a client computing device from a plurality of client computing devices;

identify a source internet protocol (IP) address and a destination internet protocol (IP) address for at least one network packet in the network traffic from the client computing device;

assign a unique subscriber identification number to the source internet protocol (IP) address and another unique identification number to the destination internet protocol (IP) address, wherein the source internet protocol (IP) address is different from the destination internet protocol (IP) address;

store an association between the unique subscriber identification number and the source internet protocol (IP) address and the another unique identification number to the destination internet protocol (IP) address in a database, wherein the database is compiled by (i) monitoring the network traffic, (ii) associating source internet protocol (IP) addresses related to network packets in the network traffic to corresponding unique subscriber identification numbers in the database, and (iii) associating destination internet protocol (IP) addresses related to network packets in the network traffic to corresponding another unique subscriber identification numbers in the database;

retrieve the unique subscriber identification number and the another unique identification number for the client computing device stored in memory from the database by using the source internet protocol (IP) address and the destination internet protocol (IP) address of subsequent network traffic of the client computing device;

obtain a network security policy associated with the identified unique subscriber identification number or the identified another unique subscriber identification; and enforce the obtained network security policy on the client computing device.

11. The network traffic management system of claim 10 wherein the network security policy is obtained from a policy server.

12. The network traffic management system of claim 10 wherein the one or more processors are further configured to execute the programmed instructions stored in the memory wherein the enforcing further comprises, enforcing the obtained network security policy on tunneled data from the client computing device.

* * * * *